(12) United States Patent
Fregonese et al.

(10) Patent No.: US 8,608,994 B2
(45) Date of Patent: Dec. 17, 2013

(54) SILICON-BASED GREEN BODIES

(75) Inventors: Daniele Fregonese, Vigonovo (IT);
Andreas Rueckemann, Ullersdorf (DE)

(73) Assignee: Evonik Degussa GmbH, Essen (DE)

( * ) Notice: Subject to any disclaimer, the term of this patent is extended or adjusted under 35 U.S.C. 154(b) by 124 days.

(21) Appl. No.: 12/994,454

(22) PCT Filed: Jul. 9, 2008

(86) PCT No.: PCT/EP2008/058926
§ 371 (c)(1),
(2), (4) Date: Nov. 24, 2010

(87) PCT Pub. No.: WO2010/003455
PCT Pub. Date: Jan. 14, 2010

(65) Prior Publication Data
US 2011/0095446 A1   Apr. 28, 2011

(51) Int. Cl.
C01B 33/14   (2006.01)
(52) U.S. Cl.
USPC .......................................................... 264/117
(58) Field of Classification Search
CPC ........................................................ C01B 33/14
USPC .......................................................... 264/117
See application file for complete search history.

(56) References Cited

U.S. PATENT DOCUMENTS

| | | | |
|---|---|---|---|
| 4,040,849 A | 8/1977 | Greskovich et al. | |
| 4,419,115 A * | 12/1983 | Johnson et al. | 65/395 |
| 4,680,048 A * | 7/1987 | Motoki et al. | 65/17.2 |
| 7,175,685 B1 | 2/2007 | Hariharan et al. | |
| 7,655,376 B2 | 2/2010 | Anderson et al. | |
| 2003/0030163 A1 | 2/2003 | Lee et al. | |
| 2007/0014682 A1 | 1/2007 | Hariharan et al. | |
| 2007/0148034 A1 | 6/2007 | Gupta et al. | |
| 2007/0265357 A1 | 11/2007 | Iversen et al. | |
| 2008/0153688 A1 | 6/2008 | Borens et al. | |

FOREIGN PATENT DOCUMENTS

| | | |
|---|---|---|
| DE | 240 729 | 11/1986 |
| EP | 1258456 A1 * | 11/2002 |
| EP | 1 717 202 A1 | 11/2006 |
| WO | 2004 055909 | 7/2004 |
| WO | WO 2005/058472 A2 | 6/2005 |
| WO | WO 2005/066672 A1 | 7/2005 |

OTHER PUBLICATIONS

"Isopropyl alcohol", wikipedia.com, accessed Jan. 24, 2013.*
Search Report and Written Opinion issued Feb. 16, 2012 in Singaporean Patent Application No. 201100096-5.
Stephen, R.G., et al., "The Compaction Behaviour of Oxidised Silicon Powder," Journal of the European Ceramic Society, vol. 9, pp. 301-307, (1992).
International Search Report issued May 27, 2009 in PCT/EP08/058926 filed Jul. 9, 2008.

* cited by examiner

Primary Examiner — Yogendra Gupta
Assistant Examiner — Alison Hindenlang
(74) Attorney, Agent, or Firm — Oblon, Spivak, McClelland, Maier & Neustadt, L.L.P.

(57) ABSTRACT

The present invention relates to a sol-gel process for the inexpensively and in large quantities agglomeration of silicon particles in a green body which is more suitable for industrial uses of silicon than the powder itself.

20 Claims, No Drawings

SILICON-BASED GREEN BODIES

The present invention relates to a sol-gel process for the inexpensively and in large quantities agglomeration of silicon particles in a green bodies which are more suitable for industrial uses of silicon than the particles itself. The silicon particles come mostly from the recycling of silicon from semiconductors industry.

Nowadays there is a soaring demand in silicon for several applications but the area that is taking more and more silicon is the photovoltaic application which is growing in western countries at a steady pace. Unlike some high tech area of application the photovoltaic application does not need extremely high impurity meaning that some silicon that is not suitable for some areas of semiconductors industry can be taken by the photovoltaics. Recently the cost of polycrystalline silicon as a raw material has soared dramatically. To date, silicon is the primary photovoltaic material, with single crystal silicon, multi-crystal silicon and amorphous silicon comprising the majority of photovoltaic market. Currently, photovoltaic and electronics-grade silicon are widely produced from hydrogen reduction of trichlorosilane (Siemens process). Trichlorosilane is generally obtained from metallurgical-grade silicon feedstock which has been mined from quartzite. The reaction for the preparation for thrichlorsilane is the following:

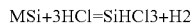

Yield from this process is around 80-90%; the remaining is mainly made up of SiCl4 which must be removed. As it is an exothermic procedure it must be cooled otherwise the yield becomes lower. The silicon produced with such process is then treated in order to obtain silicon ingots that are then cut to produce the silicon panels. It has to be said that most of the times there is a step that concerns the addition of dopants such as boron or phosphorus to produce p-type or -type ingots respectively. With few exceptions, commercial solar cells produced today are based on p-type silicon ingot material. More in detail, the production of silicon ingots goes through a manufacturing step that is called directional solidification, in Norwegian patent application No. 20035830 filed Dec. 29, 2003 it is disclosed a method for producing directionally solidified (Czochralski), float zone or multicrystalline silicon ingots or thin silicon sheets based on a silicon feedstock material produced from metallurgical grade silicon by means of metallurgical refining process, which is conducted by means of a heat-up cycle under vacuum until attaining a temperature greater or equal to 1400° C.

Only for the sake of a complete overview about the use of high purity silicon powder, it is interesting to mention the production of high grade SiO for the making of SiO films for electronic elements or heat reflecting thermal panels as well described in the patent filed by Tuemmler 1982-33176E. Also related to the use of silicon powder it is worth to mention the UK patent GB 2084979 filed by General Electric it is described a process devised for producing chlorosilanes from silicon powder.

Very few literature has been published to finding reliable process that can allow to use also fine powder in the production of polycrystalline silicon. It is in fact known that the powder is difficult to melt and that can be leads to safety issues if the atmosphere is not completely Oxygen-free. That's why it is obvious for someone skilled in the art the benefits coming from a method that allows the compacting of silicon to be used for the melting to make silicon ingots. In fact, the ultra-fine silicon powder is actually a by-product of many process concerning the manufacturing and the post-processing of silicon. Examples of processes that have ultra-fine silicon powder that cannot be directly recycled or used in melting applications are: fluid bed process for the making of electronic grade silicon, sawing of silicon bulls or chunks, rework of solar cells, or cutting of silicon wafers or ingots slicing. Interesting also to mention the method reported in the patent WO2008/041261 which is about the manufacturing of high grade silicon powder starting from multiple precursors by means of a transformer coupled plasma reactor. Also worth to report is the patent filed by Elkem A/S in which is described the melting of silicon in a big crucible and the molten silicon becomes the feed for an atomiser using inert gases. The size of the particles can be tailored from 0.1 to 1000 microns.

Most of these processes produce a very fine silicon powder which has to be purified as already described in the patent WO2006/137098. Most of the time these powders are mixed with abrasive dispersions which contains metals and/or silicon carbide particles and suspending agents such as polyethylene glycol. Normally these dispersion are reworked in order to be reused for the same application as described in the following patents: EP-A-786317, ep 0791385, WO01/43933 or U.S. Pat. No. 6,010,010. It is almost obvious that would be much more profitable to split the dispersion in its components with a major focus on the silicon part which would be sold to the photovoltaic industry after melting. As already said the fine powder cannot be molten and needs to be converted in a body that can be afterward molten. The universal method of treating fine powder is by addition of organic and inorganic binders to convert the powder to granules and pellets, as they are practised in the ceramic manufacturing as described in the U.S. patent 2006/0040064. In the Japanese patent JP2007022914 is proposed a very original method of compressing e very fine powder (0.1 micron) made of SiC, the method comprises the pressing of such powder with carbon powder in a predetermined shape; heating the compact to a temperature just beyond the melting point of silicon; and impregnating the compact heated at the temperature beyond the melting point of silicon with molten silicon. Worth also to mention the patent the method proposed in the U.S. Pat. No. 7,175,685 where the authors describes the making of silicon ingots starting form silicon pellets and tablets made by tabletting agglomerate-free high purity silicon powder without any additives and/or binders. The tabletting is performed at room temperature and the density of the pellets is in the range 1.2-1.4 ml/g, the size in within the range of 1-3 grams The present invention recognizes that it is possible to recover and recycle silicon powder. The invention proposes a method to compact the powder into "green bodies" that can be used by the smelter for the production of silicon ingots. The method is based on the so called sol-gel technology in fact it concerns the preparation of a solution with silanes in water solution and then the hydrolysis is initiated by setting the more suitable conditions. The hydrolysed solution is then added to the silicon powder that could be dried or dispersed in an organic solvent such as acetone or ethanol. The mixture so prepared is left under stirring till it is homogeneous and at this point it is poured into the molds for the preparation of the "green body". The said molds can be a crucible made of silica as those supplied by Cerandyne corp. or Vesuvium as mold can also be used any hollow objects suitable for the briquetting. The mixture in the molds is then left for consolidation of the matrix for at least 6 hours.

Without wishing to be bound to theory the authors think that in said period the so-called syneresis occurs which allows the formation of a network that is needed for providing to the said green body the needed stiffness and prevent any formation of fines.

Before to go into the details of the invention the inventors would like to give some insights on the sol-gel technology. By the name "sol-gel" it is meant a broad range of techniques for the production of dry gels and green bodies. Contrary to traditional techniques, sol-gel processes start from solutions of precursors of the desired materials and avoid passing through melting operations or any briquetting or tabletting technique. Although the technique allows for a broad range of modifications, all sol-gel processes have in common the following phases:

production of a aqueous or hydro-alcoholic solution or, more frequently, of a suspension, of at least a compound $MX_n$, generally defined as precursor, containing a cation M at least three-valent and preferably tetra-valent, whose glassy oxide formation is desired;

hydrolysis, that might be catalysed by acids or bases, of the precursor (or precursors) in the solution or suspension, with formation of M-OH groups, as shown in the reaction:

$$MX_n + nH_2O \rightarrow M(OH)_n + nHX \quad (I)$$

The thus obtained mixture, that may be a solution or a colloidal suspension, is defined as sol;

polycondensation of M-OH groups according to the reaction:

$$M\text{-}OH + M\text{-}OH \rightarrow M\text{-}O\text{-}M + H_2O \quad (II)$$

with formation of an oxydic polymer, defined gel, that takes the whole volume originally occupied by the solution. This phase is defined gelation;

drying of the gel obtaining a dry gel formed of a porous monolithic body, having apparent density (weight divided by the geometric volume of the monolithic body) comprised between about 1/20 and 1/3 of the theoretical density of the corresponding non-porous oxide; drying may be realized by controlled evaporation of the solvent, obtaining a body defined in the field as "xerogel", or by supercritical extraction of the solvent, obtaining a so-called "aerogel"; as given above, the dry gel may find industrial applications as such, or it can be submitted to densification by thermal treatment, obtaining a glassy body of theoretical density.

The invention will be further illustrated by the following examples. These non-limitative examples illustrate some embodiments meant to teach to the experts in the field how to practice the invention and to represent the best mode contemplated for realization of the invention.

EXAMPLE 1

0.7 g of tetramethoxysilane are mixed with 5 g ethanol and 1 g water and the solution so obtained is kept under stirring until complete hydrolysis of tetramethoxysilane occurs (solution becomes completely transparent). Then 14 g of silicon powder are added to the silane-based premix (weight ratio 1:0.49) and kept under stirring. The sludge so obtained is then poured in the mold. The whole process is conducted under nitrogen. Before the start of the drying phase the sample is kept in a sealed container at room temperature for the consolidation of the green body. Silicon body is then dried under ventilated hood for 3 days. The product has been characterized by means of XRD spectroscopy that has shown that the content of SiO2 in the silicon product raised only of 0.5 wt % because of the described treatment.

EXAMPLE 2

1.4 g of silica (Aerosil ox 50 supplied by Evonik industries) are mixed with 2 g water and the solution so obtained is kept under stirring until for one hour. Then 14 g of silicon powder are added to the silane-based premix (weight ratio 1:0.49) and kept under stirring. The sludge so obtained is then poured in the mold. The whole process is conducted under nitrogen. Before the start of the drying phase the sample is kept in a sealed container at room temperature for the consolidation of the green body. Silicon body is then dried under ventilated hood for 3 days. The product has been characterized by means of XRD spectroscopy that has shown that the content of SiO2 in the silicon product raised only of 0.9 wt % because of the described treatment As already said as feedstock could be used silicon revered from cutting, slicing and sawing of silicon wafer (among the others). Herewith is reported a non-limitative example which illustrates some embodiments meant to teach to the experts in the field how to practice the invention and to represent the best mode contemplated for realization of the invention.

EXAMPLE 3

Silicon powder is could be either as cake from filtration or sludges from centrifugal treatment or as dry powder; the first step is the re-slurry operation which is made by addition of deionised water and hydrochoric acid; the ratios among the chemicals. Water is added in such a quantity to adjust the density of the slurry The slurry is then added in a reactor with hydrofluoric acid. After the treatment the slurry is sent to filtration and the resulting silicon cake is washed with water, reslurried with water adjusting the density. The slurry is then mixed with hydrochloric acid and with hydrogen peroxide; water is adjusted to control the density of the slurry. After the treatment the slurry is filtrated and the filtration cake is washed with water; liquids from filtration and washing containing HCl and H2O2, are sent to a neutralization tank the final step is the hydrofluoric acid and with hydrogen peroxide in such a quantity to obtain the following ratios by weight. After the treatment the slurry is filtrated and washed with water. After filtration the product is washed again with HF and then with ethanol.

The invention claimed is:
1. A sol-gel process for agglomerating silicon powder, the process comprising:
(A) preparing a solution comprising an alkoxide precursor, water, and solvent;
(B) mixing silicon particles into the solution, to give a dispersion;
(C) keeping the dispersion under stirring;
(D) drying the dispersion until a dried green body is formed,
wherein the alkoxide precursor comprises at least one member selected from the group consisting of tetramethoxysilane, tetraethoxysilane, and methyltriethoxysilane.
2. The process according to claim 1, wherein the alkoxide precursor comprises tetramethoxysilane.
3. The process according to claim 1, wherein the alkoxide precursor comprises tetraethoxysilane.
4. The process according to claim 1, wherein the alkoxide precursor comprises methyltriethoxysilane.
5. The process according to claim 1, wherein the solution further comprises silica.
6. The process according to claim 1, wherein the solution further comprises fumed silica.
7. The process according to claim 1, wherein the solution further comprises colloidal silica.

8. The process according to claim 1, wherein the solution comprises from 1% to 50% by weight of the alkoxide precursor.

9. The process according to claim 1, wherein the solution further comprisess from 1% to 50% by weight of silica.

10. The process according to claim 1, wherein the solvent is at least one member selected from the group consisting of an alcohol, an ether, and a ketone.

11. The process according to claim 10, wherein the solvent comprises water.

12. The process according to claim 1, wherein a molar ratio of silicon/alkoxide precursor is in a range from 10 to 150.

13. The process according to claim 1, wherein a molar ratio silicon/alkoxide precursor is in a range from 1 to 150.

14. The process according to claim 1, wherein the silicon particles are dried.

15. The process according to claim 1, wherein the silicon particles are wet with organic solvent.

16. The process according to claim 11, wherein water content is between 0.1% wt and 20%.

17. The process according to claim 1, wherein before the drying (D) the dispersion is kept in a consolidation phase without solvent evaporation.

18. The process according to claim 1, wherein the drying (D) is carried out at a temperature in a range of 20 to 230° C.

19. The process according to claim 1, wherein the dispersion is poured into a mold.

20. The process according to claim 1, wherein the dried green body produced is suitable for photovoltaic application.

* * * * *